(12) United States Patent
Hochstetler

(10) Patent No.: US 12,721,254 B2
(45) Date of Patent: Sep. 1, 2026

(54) FERTILIZER/CHEMICAL DISPENSERS FOR LAWN CARE HAVING INTELLIGENT DISPENSING SYSTEMS (SMART DISPENSER LOGIC) AND ASSOCIATED METHOD OF USE

(71) Applicant: Mervin C. Hochstetler, Holland, MI (US)

(72) Inventor: Mervin C. Hochstetler, Holland, MI (US)

(*) Notice: Subject to any disclaimer, the term of this patent is extended or adjusted under 35 U.S.C. 154(b) by 233 days.

(21) Appl. No.: 18/382,628

(22) Filed: Oct. 23, 2023

(65) Prior Publication Data

US 2025/0127076 A1 Apr. 24, 2025

(51) Int. Cl.

*A01C 21/00* (2006.01)
*A01C 17/00* (2006.01)
*A01M 7/00* (2006.01)

(52) U.S. Cl.

CPC .......... *A01C 21/005* (2013.01); *A01C 17/001* (2013.01); *A01C 17/008* (2013.01); *A01M 7/0042* (2013.01); *A01M 7/0085* (2013.01); *A01M 7/0089* (2013.01)

(58) Field of Classification Search

CPC ... A01C 21/005; A01C 17/001; A01C 17/008; A01C 7/06; A01M 7/0042; A01M 7/0085; A01M 7/0089

See application file for complete search history.

(56) References Cited

U.S. PATENT DOCUMENTS 4,392,611 A 7/1983 Bachman et al.
4,671,434 A 6/1987 Johnston et al.
5,860,604 A 1/1999 Kooiker
5,990,506 A 11/1999 Fossum et al.
6,127,668 A 10/2000 Baek
6,235,549 B1 5/2001 Bawolek et al.
6,336,600 B1 1/2002 Jessen (Continued)

FOREIGN PATENT DOCUMENTS

DE 4132637 A1 * 4/1993 ............. E01H 11/00
GB 2433407 A * 6/2007 .......... A01M 7/0042
WO WO-2022192988 A1 * 9/2022 .......... A01M 7/0089

OTHER PUBLICATIONS

English translation (Year: 1993).*

(Continued)

*Primary Examiner* — Qingzhang Zhou
*Assistant Examiner* — Joel Zhou
(74) *Attorney, Agent, or Firm* — King & Partners, PLC

(57) ABSTRACT

A fertilizer/chemical dispenser having intelligent dispensing logic, including: a frame sub-assembly; a first reservoir for containing chemical solids, wherein the first reservoir is associated with the frame sub-assembly; a first dispenser for dispending chemical solids; a second reservoir for containing chemical liquids, wherein the second reservoir is associated with the frame sub-assembly; a second dispenser for dispending chemical liquids; at least one ground-engaging drive wheel; an engine, wherein the engine is associated with the frame sub-assembly; and an image sensor, wherein the image sensor is in communication with a comparative database that enables the reduction and/or avoidance of nonapplication, misapplication and/or overapplication of lawn care chemicals.

3 Claims, 7 Drawing Sheets

(56) References Cited

U.S. PATENT DOCUMENTS

| | | | |
|---|---|---|---|
| 6,359,323 | B1 | 3/2002 | Eom et al. |
| 6,369,417 | B1 | 4/2002 | Lee |
| 6,379,992 | B2 | 4/2002 | Jo |
| 6,486,913 | B1 | 11/2002 | Afghahi et al. |
| 6,765,276 | B2 | 7/2004 | Fasen et al. |
| 6,872,584 | B2 | 3/2005 | Nakashiba |
| 7,129,979 | B1 | 10/2006 | Lee |
| 8,056,828 | B1 | 11/2011 | Kline et al. |
| 8,132,741 | B2 | 3/2012 | Tremblay, Jr. et al. |
| 9,370,175 | B2 | 6/2016 | Swinney, II et al. |
| 10,721,859 | B2 | 7/2020 | Wu et al. |
| 11,122,732 | B2 | 9/2021 | Rich |
| 2004/0147059 | A1 | 7/2004 | Jeong et al. |
| 2005/0090035 | A1 | 4/2005 | Kim |
| 2005/0263839 | A1 | 12/2005 | Suzuki |
| 2006/0011813 | A1 | 1/2006 | Park et al. |
| 2006/0043261 | A1 | 3/2006 | Matsuda et al. |
| 2006/0138500 | A1 | 6/2006 | Kim |
| 2006/0157761 | A1 | 7/2006 | Park et al. |
| 2006/0261342 | A1 | 11/2006 | Wells |
| 2007/0023802 | A1 | 2/2007 | Oh et al. |
| 2007/0090274 | A1 | 4/2007 | Lee et al. |
| 2007/0187793 | A1 | 8/2007 | Moon et al. |
| 2016/0000004 | A1* | 1/2016 | Ni ........................ B05B 12/008 73/204.11 |
| 2019/0150357 | A1* | 5/2019 | Wu ........................ H04N 7/188 |
| 2020/0120861 | A1 | 4/2020 | Rich |

OTHER PUBLICATIONS

Owner/Operator's Manual, TurfEx Innovative Turf Solutions, Model RS7200, Madison Heights, Michigan (2012).

Owner's Manual, TurfEx Innovative Turf Solutions, Model RS7200E, Madison Heights, Michigan (2014-F51528A REV-A140904).

Part List, TurfEx Innovative Turf Solutions, Model RS7200E, Madison Heights, Michigan (2014-F51559 REV-A140906).

* cited by examiner

FERTILIZER/CHEMICAL DISPENSERS FOR LAWN CARE HAVING INTELLIGENT DISPENSING SYSTEMS (SMART DISPENSER LOGIC) AND ASSOCIATED METHOD OF USE

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to fertilizer/chemical dispensers (e.g., spreaders, sprayers, etcetera) for lawns, farms, etcetera, that utilize an intelligent dispensing system (smart dispenser logic, i.e., SDL) having the capacity to selectively gather, obtain, monitor, store, record, and analyze data associated with the treatment area (e.g., a customer's or owner's lawn) prior to application of, for example, fertilizers, herbicides, insecticides, pesticides, fungicides, pH modifiers, etcetera. The smart dispenser logic of the present invention can controllably communicate and disseminate data with other systems and users, including owners and customers. The smart dispenser logic systems of the present invention increase user safety and lawn care quality (e.g., professional outcomes for customers), as well as decrease equipment abuse. The intelligent systems of the present invention also enable a user to report, for example, lawn/treatment conditions, time spent on the job, precision and accuracy of chemical/fertilizer dispensed, dispensing completeness, error reports, diagnostic component and/or equipment reports—just to name a few.

By way of background, typical lawn care companies fertilize or treat an entire customer's lawn with the same general treatment protocol regardless of what the lawn needs. For example, if 10% of a customer's lawn is affected by an undesirable weed, then the entire lawn is typically treated with a herbicide. This is problematic from at least three perspectives. First, 90% of the lawn is unnecessarily treated which stunts, stresses and/or adversely affects the portion of the lawn void of weeds. Second, such a treatment protocol results in an overapplication of chemicals (often times toxic chemicals) by a factor of nine. To be sure, this over application of chemicals can have a disastrous effect on downstream bodies of water and land that animals feed off of and/or live in. Furthermore, overapplication of chemicals unnecessarily increases cost to the customer.

Additionally, the image sensors utilized in the present invention can detect problematic areas in a lawn that a typical serviced technician cannot see with his/her eyes-especially during early onset of an undesirable condition (e.g., red thread, crabgrass, broadleaf weeds, the presence of grubs, etcetera). Early detection can prevent nonapplication of a required localized treatment protocol and avoid costly generalized treatment to the entire lawn.

By way of contrast, the intelligent dispensing systems of the present invention utilize image sensors, current weather data, and/or historical treatment data to determine precisely what area of the lawn needs treatment, as well as the minimum concentration required to properly treat the affected area. The intelligent dispensing systems of the present invention enable localized treatment of problematic areas in the lawn using real time data toward reducing and/or avoiding nonapplication, misapplication and/or overapplication of lawn care chemicals. The intelligent dispensing systems of the present invention also provide the customer with an easy to read, graphical report that identifies what area of the lawn has been treated and with what particular chemical and concentration.

2. Background Art

Fertilizer spreaders and chemical sprayers have been known in the art for years and are the subject of a plurality of patents and/or publications, including: U.S. Pat. No. 11,122,732 entitled "Fertilizer Distribution Metering System and Method," U.S. Pat. No. 10,721,859 entitled "Monitoring and Control Implement for Crop Improvement," U.S. Pat. No. 9,370,175 entitled "Sprayer with Easily Locatable Operational Controls, Hill Assist, Pivotal Hose Reel, and Agitation Boost," U.S. Pat. No. 8,132,741 entitled "Spraying Apparatus and Method for Using Same," U.S. Pat. No. 8,056,828 entitled "Methods and Apparatus for Applying Product," U.S. Pat. No. 6,336,600 entitled "Self-Propelled Material Spreader," U.S. Pat. No. 5,860,604 entitled "Motorized Fertilizer Spreader," U.S. Pat. No. 4,671,434 entitled "Fertilizer Spreader," U.S. Pat. No. 4,392,611 entitled "Sprayer Control System," and United States Patent Application Publication Number 2020/0120861 entitled "Fertilizer Distribution Metering System and Method"-all of which are hereby incorporated herein by reference in their entirety including all references cited therein. It will be understood that the fertilizer/chemical dispensers of the present invention can utilize some and/or all components, structures, and methods disclosed in the above-identified references.

U.S. Pat. No. 11,122,732 appears to disclose a metering system and method of operating fertilizer distribution equipment, such as a spreader-sprayer, that includes monitoring revolution data for opposing left and right wheels with left and right sensors. A controller controls an actuator's operation to operably regulate the output of a liquid and/or solid fertilizer product. The fertilizer output is based at least in part on the revolution data and a fertilizer unit-per-area input.

U.S. Pat. No. 10,721,859 appears to disclose machinery that includes an automated crop management motorized vehicle having an intelligent, modularized image sensor (e.g., camera or video) system that is portable to other crop management vehicles such as a combine, planter or a tillage machine. The image sensor system includes a framework having a bank of procedures for monitoring and control of navigation, spray application, weeding, seeding, machine configuration, in real time as the machines go through a crop field throughout a crop cycle. One example implementation includes electronic circuits, with more than one set mounted on a platform that facilitates moving the setup to other agricultural machines. The framework captures, preserves and corrects the captured images for real time analysis and response, and for spray management to improve crop yield that is correlated with the machine settings and crop management practices.

U.S. Pat. No. 9,370,175 appears to disclose a vehicle mounted sprayer that has a plurality of spray booms equipped with downwardly facing spray nozzles. A control console includes a rounded palm rest with the most often used operational spray controls placed directly ahead of the palm rest for easy actuation by the operator as the operator rests the palm of one hand on the palm rest. A pivotal hose reel for manual spraying has pivotal motion about a vertical axis into one of a plurality of adjusted positions relative to the sprayer to ease unwinding and rewinding of the hose from the hose reel. A hill assist system holds the sprayer on a hill for a predetermined time to give the operator enough time to place the sprayer into forward motion up the hill from a standing stop. The spray through the booms can be selectively added to flow in a tank agitation system to boost agitation effectiveness.

U.S. Pat. No. 8,132,741 appears to disclose systems and methods for applying substances to target areas. The system includes a hood supported by a frame and moveable relative thereto between open and closed positions, and one or more spray heads coupled to the underside of the hood and configured to spray the target area when the hood is in the closed position, the spray heads and the hood configured such that the hood provides a wind barrier for the spray from the spray heads. The system further includes a liquid tank for holding the substance to be applied to the target area, an agitation system for desired mixing of the tank contents, and fluid pathways for delivery of the contents of the tank to the spray heads for application to the target area.

U.S. Pat. No. 8,056,828 appears to disclose an apparatus that applies product in liquid or granular form to an area and includes a pivotal platform solely supported to a vehicular portion through bushings formed of compressible material to reduce operator fatigue. The apparatus ground speed can be locked by stepping on a step pivoting a composite block to engage with an engagement of the transmission proportioner arm. A gate of the hopper is opened utilizing a control lever pivotally mounted to a pivotably mounted control block to either engage or avoid a tang of an adjustment guide. A drive belt system includes a variator having first and second sheaves having variable effective diameters when their pivot pin is moved by pivoting a lever. A spray tip sprays a fan style spray at a small acute angle to the application area. A flip shield is pivoted about an axis parallel to the movement direction and includes a linear straight portion parallel to the axis in a redirection position.

U.S. Pat. No. 6,336,600 appears to disclose a self-propelled lawn and garden spreader that can be used to apply granular and/or liquid materials to both wide and narrow areas at a constant rate of application per unit area at different ground speeds, such as at a relatively high speed when the operator of the spreader is riding on the spreader, and at a relatively low speed when the operator is walking behind the spreader. The spreader generally includes a frame on which a suitable motor is mounted, wheels mounted to the frame with at least one of the wheels being driven by the motor, and a unit for controlling the ground speed of the spreader, including at least two forward speeds. The spreader further includes a material storage compartment mounted to the frame for containing a material. The material storage compartment has an outlet through which the material exits the material storage compartment and is delivered to a dispenser unit that broadcasts the material outwardly including away from the sides of the frame. Finally, the spreader includes a device for controlling material flow from the material storage compartment to the dispenser unit. The material flow control device provides at least two flow rates of the material to the dispenser unit, in which the flow rates are synchronized with the at least two forward speeds of the spreader so that the spreader dispenses the material to achieve an approximately constant application rate per unit area at the at least two forward speeds.

U.S. Pat. No. 5,860,604 appears to disclose a motorized spreader for dispersing granular and other material, such as fertilizer, seed, and salt, or the like, provides improved uniform control of the flow of the material from the spreader. The motorized spreader includes a frame and drive train supporting the frame. A hopper for holding granular material is also supported on the frame and includes a dispensing opening for directing the flow of granular material from the hopper onto the ground. An agitator is positioned in the hopper for urging the granular material in the hopper toward the dispensing opening so that the flow of the granular material from the hopper is controlled. The drive train includes first and second wheels, with each wheel including an axle. A differential drivingly couples the axles of the wheels together and includes a first drive sprocket and a second drive sprocket, the first drive sprocket coupling to a motor to drive the motorized spreader at a ground speed. The second drive sprocket couples to the agitator for driving the agitator so that the rotational speed of the agitator is proportional to the ground speed of the motorized spreader for regulating the flow of the granular material through the dispensing opening.

U.S. Pat. No. 4,671,434 appears to disclose a fertilizer spreader having a hopper for holding a granular material. A handle is connected to the hopper for manipulating the hopper. The hopper has a discharge aperture in its lower portion to allow material to discharge from the hopper. A gate is selectively positionable adjacent to the discharge aperture for controlling the rate of discharge of material through the discharge aperture. A control apparatus is connected to the gate for holding the gate in a selected position relative to the discharge aperture. A pivotal support leg is connected to the control apparatus and the hopper, so that when the support leg supports the hopper, the leg is pivoted to operate the control apparatus to position the gate in an attitude for interrupting the flow of material through the discharge aperture.

U.S. Pat. No. 4,392,611 appears to disclose an automatic control system for a vehicular liquid sprayer includes a control circuit for receiving a liquid pressure signal and a vehicle ground speed signal and operator accessible controls for delivering to the control circuit signals corresponding to a desired application rate, to the number of nozzles associated with the vehicular liquid sprayer and to the nozzle spacing. The operator may vary the input signal corresponding to desired application rate plus or minus a given percentage to compensate for tolerances in the liquid sprayer system. The control circuit calculates the liquid pressure necessary to achieve the desire application rate and the difference between this desire liquid pressure and the measured liquid pressure and produces control signals corresponding to this difference. A duty cycle control circuit converts these control signals to a cyclical control signal for driving a motor-driven flow control valve. The duty cycle of this cyclical control signal varies in proportion to the magnitude of the pressure difference. This duty cycle controlled signal is automatically modified to overcome inertia and motor lag time in a motor driven flow control valve, and to shut off the valve at a given minimum operating pressure.

United States Patent Application Publication Number 2020/0120861 appears to disclose a metering system and method of operating fertilizer distribution equipment, such as a spreader-sprayer, is described that includes monitoring revolution data for opposing left and right wheels with left and right sensors. A controller controls an actuator's operation to operably regulate the output of a liquid and/or solid fertilizer product. The fertilizer output is based at least in part on the revolution data and a fertilizer unit-per-area input.

While the above-identified patents and/or publications do appear to disclose various fertilizer spreaders and chemical sprayers and associated systems, their configurations remain non-desirous, incompatible, and/or problematic inasmuch as, among other things, none of the above-identified spreaders/sprayers and associated systems appear to include an intelligent dispensing system having the capacity to selectively gather, obtain, monitor, store, record, and analyze data associated with the treatment area (e.g, a customer's lawn) prior to application of, for example, fertilizers, herbicides, insecticides, pesticides, fungicides, etcetera toward avoiding nonapplication, misapplication and/or overapplication of lawn care chemicals.

It is therefore an object of the present invention to provide fertilizer spreaders and chemical sprayers having smart logic and/or intelligent systems that have the capacity to selectively gather, obtain, monitor, store, record, and analyze data associated with the lawn to reduce and/or avoid nonapplication, misapplication and/or overapplication of lawn care chemicals.

These and other objects of the present invention will become apparent in light of the present specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

SUMMARY OF THE INVENTION

Figure 1:
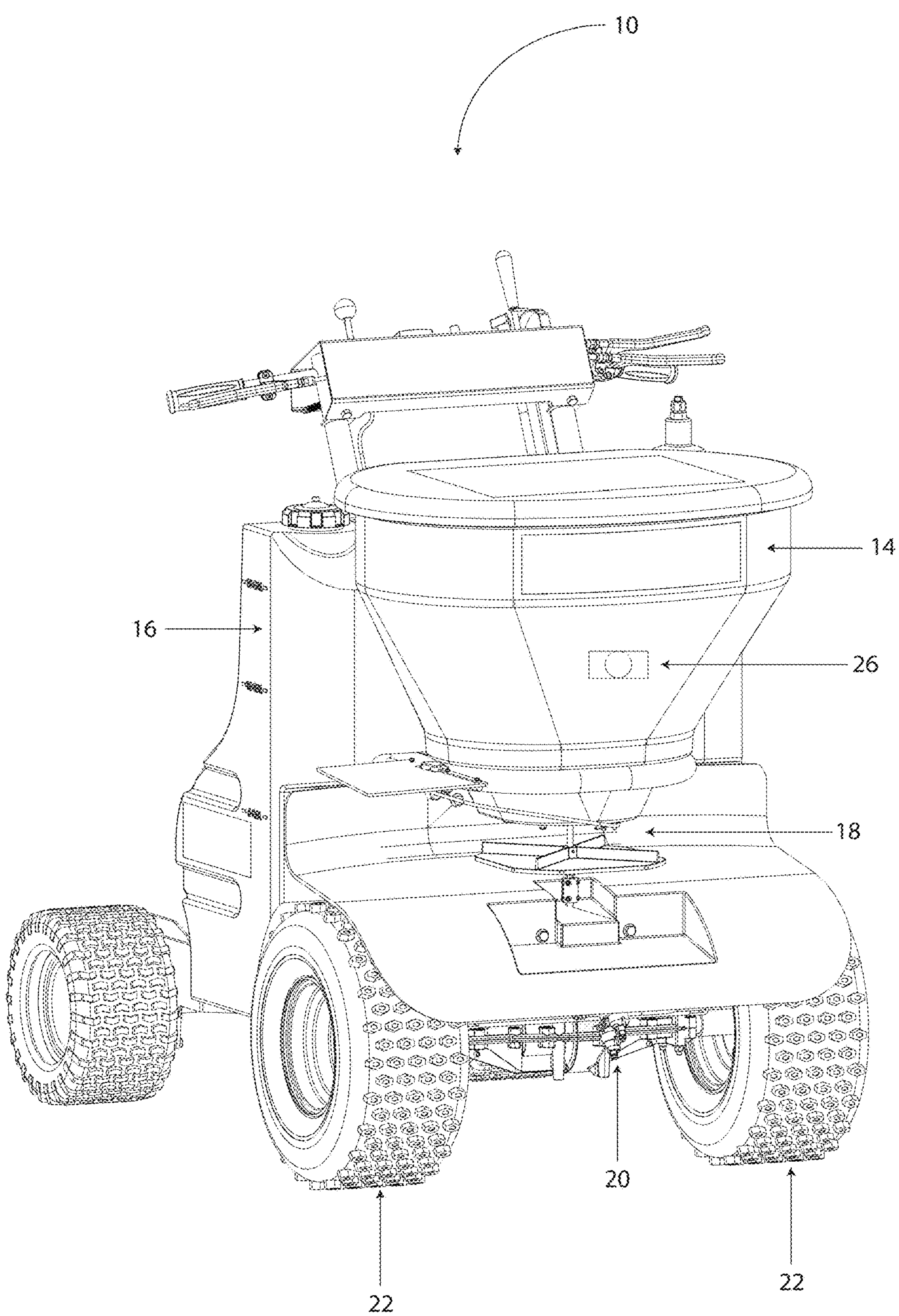
FIG. 1 of the drawings is a front perspective view of a fertilizer/chemical dispenser fabricated in accordance with the present invention.

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to, in one embodiment, a fertilizer/chemical dispenser having intelligent dispensing logic comprising, consisting essentially of, and/or consisting of: (a) a frame sub-assembly; (b) a first reservoir for containing chemical solids, wherein the first reservoir is associated with the frame sub-assembly; (c) a first dispenser for dispending chemical solids; (d) a second reservoir for containing chemical liquids, wherein the second reservoir is associated with the frame sub-assembly; (e) a second dispenser for dispending chemical liquids; (f) at least one ground-engaging drive wheel; (g) an engine, wherein the engine is associated with the frame sub-assembly; and (h) an image sensor, wherein the image sensor is in communication with a comparative database that enables the reduction and/or avoidance of nonapplication, misapplication and/or overapplication of lawn care chemicals.

The present invention is also directed to, in one embodiment, a fertilizer/chemical dispenser having intelligent dispensing logic comprising, consisting essentially of, and/or consisting of: (a) a frame sub-assembly; (b) a first reservoir for containing chemical solids, wherein the first reservoir is associated with the frame sub-assembly; (c) a first dispenser for dispending chemical solids; (d) a second reservoir for containing chemical liquids, wherein the second reservoir is associated with the frame sub-assembly; (e) a second dispenser for dispending chemical liquids; (f) at least one ground-engaging drive wheel; (g) an engine, wherein the engine is associated with the frame sub-assembly; and (h) a smart chemical dispenser logic system comprising an image sensor/controller, wherein the image sensor/controller is configured to at least one of selectively gather, obtain, monitor, store, and record data associated with a treatment area prior to application of fertilizer/chemical, and wherein the image sensor/controller communicatively couples the fertilizer/chemical dispenser with a management server over a network and transmits data to the management server for analysis.

The present invention is further directed to, in one embodiment, a method for using a smart chemical dispenser system with a fertilizer/chemical dispenser, comprising the steps of, consisting essentially of the steps of, consisting of the steps of: (a) providing a fertilizer/chemical dispenser having a smart dispenser system; (b) selectively calibrating, gathering, obtaining, monitoring, storing, recording, and/or analyzing data associated with a lawn treatment area; and (c) controllably communicating and/or disseminating data with at least one of another system and user.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

It will be further understood that FIGS. 1-4 are merely representations and/or illustrations of fertilizer/chemical spreader-sprayer and their associated sub-assemblies and methodologies. As such, some of the components may be distorted from their actual scale for pictorial clarity and/or image enhancement.

Unless otherwise specified, the machines, sub-assemblies, components and/or parts provided herein below are commercially available from Aesthetic Gardner, L.L.C. (Holland, Michigan) or a subsidiary thereof.

Figure 2:
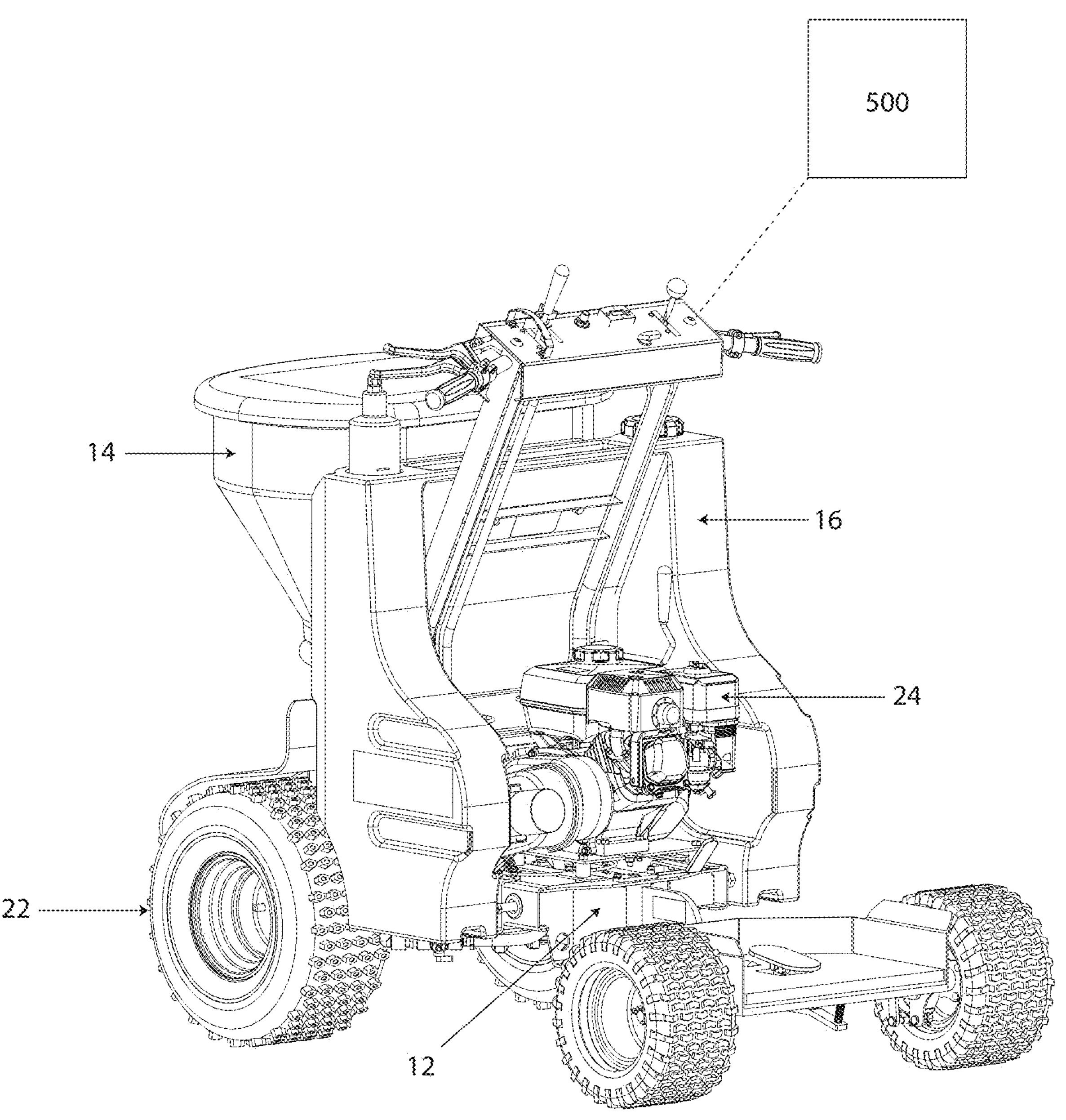
FIG. 2 of the drawings is a rear perspective view of a fertilizer/chemical dispenser fabricated in accordance with the present invention.

Referring now to the drawings, and to FIGS. 1-2 in particular, perspective views of fertilizer/chemical spreader-sprayer-dispenser 10 having smart dispending logic and/or intelligent system is shown as generally comprising chassis or frame sub-assembly 12, first reservoir 14, second reservoir 16, first dispenser 18, second dispenser 20, one or more ground-engaging drive wheels 22, engine 24, and image sensor 26 associated with controller 500 (preferably controller 500 is associated with and/or integrated into image sensor 26) that is in communication with a comparative database (can be local and/or remote) that enables the reduction and/or avoidance of nonapplication, misapplication and/or overapplication of lawn care chemicals. For purposes of avoiding prolix, additional structural and/or functional features of fertilizer/chemical spreader-sprayer-dispenser 10 are provided in Owner/Operator's Manual, TurfEx Innovative Turf Solutions, Model RS7200, Madison Heights, Michigan (2012), Owner's Manual, TurfEx Innovative Turf Solutions, Model RS7200E, Madison Heights, Michigan (2014-F51528A REV-A140904), and Part List, TurfEx Innovative Turf Solutions, Model RS7200E, Madison Heights, Michigan (2014-F51559 REV-A140906)—all of which are hereby incorporated herein by reference in their entirety including all references cited therein. These references are provided in PTO-1449 accompanying the application as originally filed.

Chassis or frame sub-assembly 12 of fertilizer/chemical spreader-sprayer-dispenser 10 is preferably fabricated from a metal, a metal alloy, a natural resin, a synthetic resin, a plastic, a composite, wood, and/or combinations thereof. Frame sub-assembly 12 may comprise a unitary body, a multi-piece body, a welded body, and/or a stamped body.

Fertilizer/chemical spreader-sprayer-dispenser 10 includes one or more reservoirs for containing and dispensing fertilizer/chemicals in solid and/or liquid form. In a preferred embodiment, fertilizer/chemical spreader-sprayer-dispenser 10 includes first reservoir 14 that is adapted to contain, retain, and dispense chemical solids (e.g., fertilizers, herbicides, insecticides, pesticides, fungicides, pH modifiers, etcetera). First reservoir 14 is preferably mounted on, secured to, and/or forms part of chassis/frame sub-assembly 12. First dispenser 18 dispenses and distributes chemical solids from first reservoir 14. In accordance with the present invention, first reservoir 14 may comprise a single bin/reservoir and/or multiple bins/reservoirs (e.g., 1, 2, 3, 4, 5, 6, 7, 8, 9, 10, 15, 20, etcetera) for dispensing of one or more fertilizers/chemicals.

In a preferred embodiment, fertilizer/chemical spreader-sprayer-dispenser 10 includes second reservoir 16 that is adapted to contain, retain, and dispense chemical liquids (e.g., fertilizers, herbicides, insecticides, pesticides, fungicides, pH modifiers, etcetera). Second reservoir 16 is preferably mounted on, secured to, and/or forms part of chassis/frame sub-assembly 12. Second dispenser 20 preferably includes one or more nozzles that dispense and controllably distribute one or more chemical liquids from second reservoir 16. In accordance with the present invention, second reservoir 16 may comprise a single bin and/or multiple bins (e.g., 1, 2, 3, 4, 5, 6, 7, 8, 9, 10, 15, 20, etcetera) for dispensing of one or more fertilizers/chemicals. In one embodiment of the present invention, the frame sub-assembly and/or one or more reservoirs/bins may utilize one or more weight sensors for calibrating one or more reservoirs/bins that hold/dispense material (e.g., solids, liquids, etcetera). These sensors calibrate material dispensed per area for validating regulatory compliance, reporting purposes and/or historical data preservation. These sensors can be associated with PCB 500 or any other component of the spreader-sprayer-dispenser.

As is best shown in FIGS. 1-2, fertilizer/chemical spreader-sprayer-dispenser 10 includes one or more (e.g., 1, 2, 3, 4, 5, 6, 7, 8, 9, 10, etcetera) ground-engaging wheels 22. At least one of these wheels is preferably a drive wheel so that the technician is not required to push the spreader. In one preferred embodiment of the present invention, spreader-sprayer-dispenser 10 includes a front pair of drive wheels and a rear pair of non-drive wheels.

Fertilizer/chemical spreader-sprayer-dispenser 10 includes engine 24. It will be understood that engine 24 may also and/or alternatively comprise and electric motor powered by a primary and/or secondary electrochemical cell.

Fertilizer/chemical spreader-sprayer-dispenser 10 also includes image sensor 26 preferably having integrated controller 28 that is in communication with a comparative database (can be local and/or remote) that enables the reduction and/or avoidance of nonapplication, misapplication and/or overapplication of lawn care chemicals. Examples of suitable image sensors include video camera tubes, semiconductor charge-coupled devices (CCD), active pixel sensor in complementary metal-oxide-semiconductors (CMOS), N-type metal-oxide-semiconductors (NMOS, Live MOS), and back-side illuminated complementary metal-oxide-semiconductors (BSI-CMOS).

It will be understood that the above-identified image sensors are commercially available from a plurality of sources, including Agilent, Aptina, Canesta, Canon, Caeleste, CMOSIS, Dalsa, Eastman Kodak, ESS Technology, Fujifilm, MagnaChip, Matsushita, MAZeT GmbH, Mitsubishi, Nikon OmniVision Technologies, ON Semiconductor, Cypress Semiconductor, PixArt Imaging, Pixim, Samsung, Sharp, Sony, STMicroelectronics, Toshiba, TowerJazz, Town Line Technologies, TransChip, Trusight and Trusense Imaging—just to name a few suppliers.

Additional examples of suitable image sensors for use in accordance with the present invention include U.S. Pat. No. 6,359,323 B1 entitled "Color image sensor and method for fabricating the same," United States Patent Application Publication No. 2006/0043261 A1 entitled "Solid state image pickup device and image pickup system comprising it," U.S. Pat. No. 7,129,979 B1 entitled "Image sensor pixel for global electronic shuttering," United States Patent Application Publication No. 2004/0147059 A1 entitled "Method for manufacturing CMOS image sensor having microlens therein with high photosensitivity," U.S. Pat. No. 5,990,506 A entitled "Active pixel sensors with substantially planarized color filtering elements," U.S. Pat. No. 6,235,549 B1 entitled "Method and apparatus for employing a light shield to modulate pixel color responsivity," U.S. Pat. No. 6,765,276 B2 entitled "Bottom antireflection coating color filter process for fabricating solid state image sensors," U.S. Pat. No. 6,486,913 B1 entitled "Pixel array with shared reset circuitry," U.S. Pat. No. 6,872,584 B2 entitled "Solid state image sensor and method for fabricating the same," United States Patent Application Publication No. 2006/0011813 A1 entitled "Image sensor having a passivation layer exposing at least a main pixel array region and methods of fabricating the same," United States Patent Application Publication No.

2007/0187793 A1 entitled "Filter, color filter array, method of manufacturing the color filter array, and image sensor," U.S. Pat. No. 6,379,992 B2 entitled "Method for fabricating an image sensor," United States Patent Application Publication No. 2006/0138500 A1 entitled "CMOS image sensor and method for fabricating the same," United States Patent Application Publication No. 2005/0263839 A1 entitled "Photoelectric converting film stack type solid-state image pickup device, and method of producing the same," United States Patent Application Publication No. 2007/0090274 A1 entitled "Image sensors including active pixel sensor arrays," United States Patent Application Publication No. 2006/0157761 A1 entitled "Image sensor with self-boosting and methods of operating and fabricating the same," U.S. Pat. No. 6,369,417 B1 entitled "CMOS image sensor and method for fabricating the same," U.S. Pat. No. 6,127,668 A entitled "Solid state image pickup device and method for manufacturing the same," United States Patent Application Publication No. 2007/0023802 A1 entitled "CMOS image sensor and method of fabricating the same," United States Patent Application Publication No. 2005/0090035 A1 entitled "Method for fabricating CMOS image sensor protecting low temperature oxide delamination," and United States Patent Application Publication No. 2006/0261342 A1 entitled "Imaging device having a pixel cell with a transparent conductive interconnect line and the method of making the pixel cell"—all of which are hereby incorporated herein by reference in their entirety, including all references cited therein.

Figure 7:
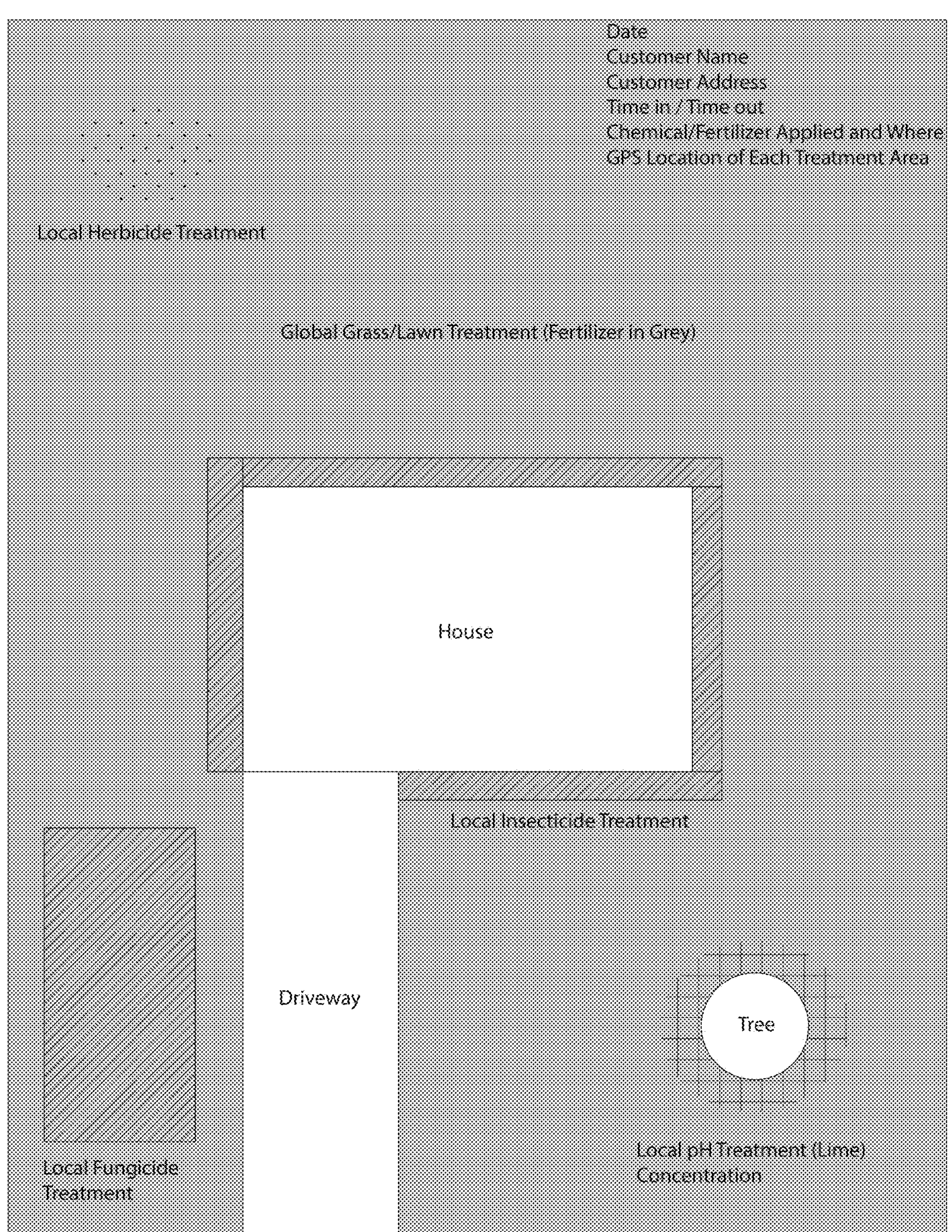
FIG. 7 of the drawings is a customer report of the present invention.

The image sensor and/or controller (e.g., printed circuit board (PCB)) enable at least one of the following (1) incorporating safety logic to increase user safety during normal operation, (2) reducing equipment abuse through controlled reduced speed modes, (3) monitoring hydraulic pressure readings, torque readings, and wheel revolution readings, (4) calibrating and regulating the pair of drive wheels, (5) controlling the sensitivity of steering handles, (6) providing real-time GPS locations readings, (7) uploading data in real time to a management server, (8) transmitting a communication and/or billing to customer upon job completion with optional photograph and/or GPS verified time on job data, (9) transmitting an error report, and/or diagnostic component and/or equipment failure and/or non-failure report, (10) automating calibration, such as lbs. of fertilizer in hopper and amount used, measuring wheel revolution and distance traveled, (11) utilizing GPS systems for remembering location of certain condition and problems, and store data what was done in previously applications, (12) calculating machine speed fertilizer to applied, width covered, overlap coverage, (13) identifying and remembering customer property for next application (e.g., determine how much is needed, applicator can also look up record on previous application), (14) automating weed spray (e.g., using image sensors to distinguish weeds from plants), (15) using multiple hoppers for custom applications (For example in spring crabgrass control application, crabgrass only grows in a sunny lawn and not in a shady part of lawn. In many cases lawns have both sunny areas and shady areas so there is a need on same property to switch bins and/or modify application. Not applying crabgrass control to shady gives applicator opportunity re-seed the shady are without the waiting for 120 days. In other cases you may need to apply 2 different granules simultaneously like a fertilizer and an insecticide), (16) using multiple spray tanks for custom applications (Multiple chemicals can be applied simultaneously on an as needed basis. This reduces chemical use in one's environment), (17) detecting plant and soil fungus, (18) detecting insects, larva, and eggs, (18) determining wind speed and direction to prevent drift and/or overspraying, (19) detecting hydration of soil—especially in drought season, (20) communicating with GPS apps, smart phone apps, billing software, (21) storing data for record keeping, (22) emailing customer a report for chemicals used and/or MSDS sheet, job completion, and/or recommendations (See FIG. 7), (23) making suggestions and recommendations to technicians/applicators for custom applications, (24) providing verification of manufacturer's warranty, (25) providing data to improve customer service and surveys, and (26) providing data for employers/managers.

As will be explained in greater detail below, the smart spreader logic system preferably comprises controller 500, wherein the controller is configured to at least one of selectively gather, obtain, monitor, store, and record data associated with components of the fertilizer/chemical dispenser and/or the lawn being treated, and wherein the controller communicatively couples the fertilizer/chemical dispenser with a management server over a network and transmits data to the management server for analysis.

In accordance with the present invention, a method for using a smart spreader logic and/or an intelligent system with a fertilizer/chemical dispenser is provided and generally, comprises the following steps: (1) providing a fertilizer/chemical dispenser having smart spreader logic and/or an intelligent system; (2) selectively calibrating, gathering, obtaining, monitoring, storing, recording, and/or analyzing data associated with components of the fertilizer/chemical dispenser and/or lawn being treated; and (3) controllably communicating and/or disseminating data with at least one of another system and user. In particular, and as is collectively shown in FIGS. 1-7, an intelligent system enables a fertilizer/chemical dispenser to transmit data obtained from the fertilizer/chemical dispenser to during normal use, for example, a storage or data server, which, in turn, transmits selected data to, for example, an end user via email and/or text messaging.

FIG. 2 includes printed circuit board (PCB) 500 (e.g., controller) which includes the smart spreader logic and can be associated with any component of fertilizer/chemical dispenser 10.

The PCB 500 (e.g., controller) functions as a main controller board for controlling and communicating with various components of the fertilizer/chemical dispenser. In some embodiments, the PCB 500 can include one or more features of an example computing machine illustrated and described with respect to FIG. 6. The PCB 500 includes at least a processor and a memory for storing executable instructions. The processor can execute the instructions to provide any of the data sensing, calibrating, gathering, processing, transforming, and/or communication features described herein.

It will be understood that the PCB 500 can be referred to generally as having smart spreader logic and/or an intelligent system or component that is configured to provide data calibrating, gathering, recording, logging, transmitting, and analysis functionalities. In other embodiments, an intelligent system can include the PCB 500 that cooperates with a management server, where the PCB 500 gathers and collects operational data for the fertilizer/chemical dispenser and the management server performs data analysis functionalities on the operational data.

Generally, the PCB 500 is communicatively coupled to one or more of the components of the fertilizer/chemical dispenser and/or accessory, either directly or indirectly. For example, the PCB 500 directly communicates with the batteries of the fertilizer/chemical dispenser, through a battery interface, while the PCB 500 indirectly couples with a transaxle motor interface through a speed control board.

The battery interface allows for the PCB 500 to communicate with the batteries to receive feedback including charge level, average usage and current draw, as well as other battery related metrics.

A charger interface allows the PCB 500 to determine charging metrics such as average charging times.

A main power key switch is controlled by the PCB 500 to allow the fertilizer/chemical dispenser to be turned on and off. Key metrics around the main power key switch preferably include start and stop times. The PCB 500 can time stamp each operation such as device on and device off instances and record these metrics for statistical or reporting purposes. Other statistics could include time duration between device on and device off operations, which indicate duration of usage for the fertilizer/chemical dispenser.

An hour meter switch is controlled by the PCB 500 to calculate hours of operation for the fertilizer/chemical dispenser, in some embodiments.

Sensors associated with the dispensing nozzles/blades and/or drive wheels can be controlled by the PCB 500 to selectively control engagement or disengagement of the dispensing nozzles or drive wheels of the fertilizer/chemical dispenser. The PCB 500 can track dispensing nozzle operations by measuring engagement and disengagement of the nozzle valve and/or PTO drive.

These statistics can be compared against device on and device off periods to determine how long the dispensing nozzle is engaged compared to the overall time frame of device on periods. By way of example, the PCB 500 can measure that the device is in a device on state for two hours, but the dispensing nozzle and/or blade was only in use for 2 minutes.

A safety switch can be controlled with the PCB 500, for example, to preclude the dispensing nozzles and/or blade from dispensing chemicals. In some embodiments, when the PCB 500 activates a safety switch, the PTO or spreader shaft can be controlled to disengage the spreader plate/blade. Other safety related operations can also likewise be accomplished using the safety switch.

An emergency control switch is controlled by the PCB 500 to control operation of an emergency switch of the fertilizer/chemical dispenser. A user can stop operation of the fertilizer/chemical dispenser by actuating the emergency switch. Actuation of the emergency switch is sensed by the PCB 500, causing the PCB 500 to selectively stop engine, drive wheels, transmissions, PTO, transaxle, dispensing nozzles/plates/blades, electrical system, hydraulic system, and/or accessories.

In one embodiment, the emergency control switch can be used to selectively disrupt power provided to a speed control board. That is, the speed control board is configured to control operation of the transaxle motor, by way of the transaxle motor interface.

A pair of light interfaces can be used by the PCB 500 to selectively control operation of lights that indicate operational statuses of the fertilizer/chemical dispenser 10, such as forward, backward, power on, nozzle dispenser engagement, and so forth.

In one embodiment, a speed potentiometer is controlled by a speed control board to sense input from a user that can be used to vary the speed of the device. For example, the speed potentiometer can receive a speed indication from a user. The speed indication is received by the PCB 500 from input into the speed potentiometer. This input is then translated into rotational speed of the transaxle motor through the transaxle motor interface.

The forward and reverse control of the drive wheels is preferably controlled by traditional handles. In some embodiments, a speed control board utilizes the control handles to provide movement of the fertilizer/chemical dispenser. In other embodiments, the drive wheels are controlled by a steering wheel and/or foot pedal.

In one embodiment, in response to signals through the control handles a transaxle interface can be used by a speed control board to selectively control the operation of a transaxle motor. For example, the speed control board can selectively control the forward and/or backward rotation of one or both of the drive wheels.

Figure 6:
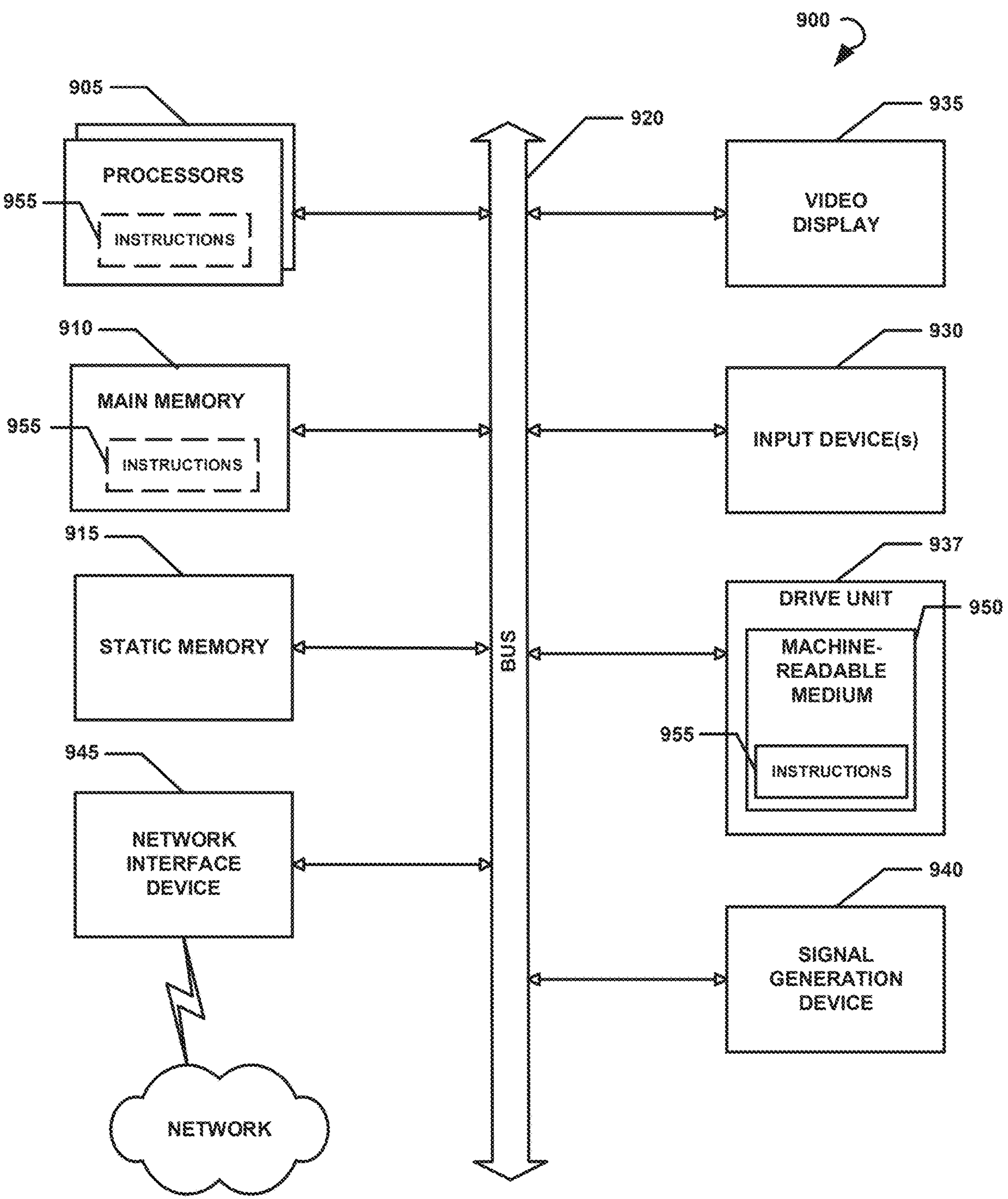
FIG. 6 of the drawings is a diagrammatic representation of a machine in the form of a computer system.

As with the PCB 500, a speed control board can include one or more of the components of the computing machine of FIG. 6, such as a processor and memory. To be sure, the memory is configured with executable instructions that allow the processor to perform any of the functional or process related steps described herein.

Additionally, the PCB 500 can be configured to sense and collect the operational information. For example, the PCB 500 can determine operational speeds for a transmission, transaxle, engine, usage times, and so forth.

The PCB 500 can also control the dispensing nozzles/plates/blades. As with other components, the PCB 500 can be configured to sense and collect operational details of components.

Figure 3:
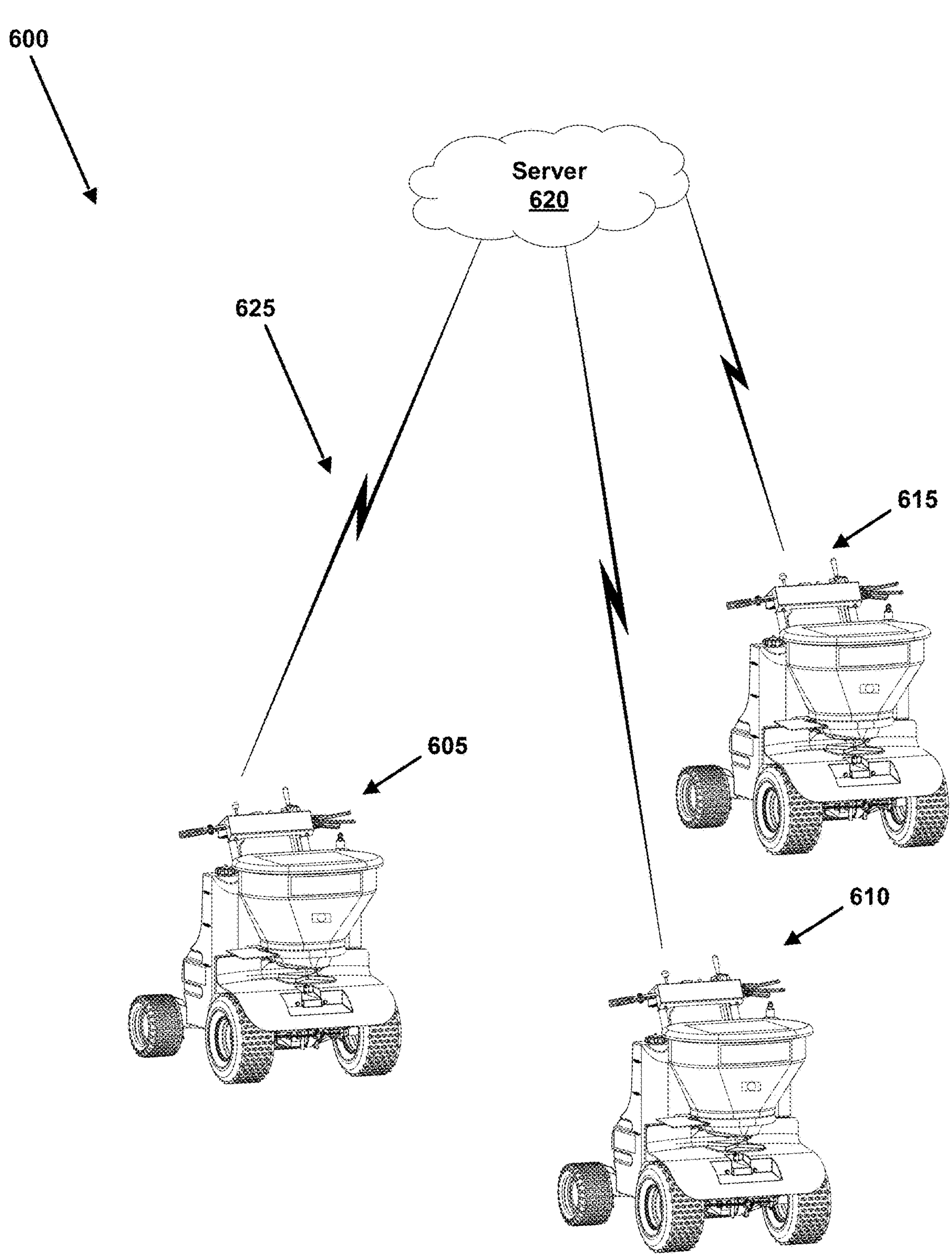
FIG. 3 of the drawings is an illustrative example of a network system of fertilizer/chemical dispensers.

In some embodiments, the PCB 500 communicates within an intelligent system 600, illustrated in greater detail in FIG. 3. The PCB 500 can include any wired or wireless means of communication such as a wireless communications interface. The wireless communications interface can utilize any protocol for network communication including short range protocols such as Bluetooth, near field communications (NFC), infra-red, and so forth. The wireless communications interface can also include utilize Wi-Fi, a cellular network, or other similar networks using other protocols.

FIG. 3 illustrates an example network system of devices. The networked system 600 comprises a plurality of devices 605, 610, and 615, which can all communicatively couple with a management server 620 over a network 625.

Each of the plurality of devices 605-615 can be collocated in the same facility, such as a jobsite, building, or other location. In other embodiments, one or more (or all) plurality of devices 605-615 can be remotely located from one another.

Each of the plurality of devices 605-615 can gather and report its operational metrics to the management server 620 over the network 625, as will be discussed in greater detail below.

Exemplary networks, such as network 625 may include any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface)

connection. Furthermore, communications may also include links to any of a variety of wireless networks, including 4GLTE (Long Term Evolution), 3GPP (3G Radio Access Network), WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 620 can further include or interface with any one or more of an RS-232 serial connection, an IEEE-1394 (Fire wire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The management server 620 is preferably implemented in a cloud-computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources. The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In operation, each of the plurality of devices 605-615 can communicate with the management server 620, with each of the plurality of devices 605-615 acting as a node within the network. The management server 620 can track metrics about each of the plurality of devices 605-615 by communicating with the PCB on each of the plurality of devices 605-615.

In some embodiments, data obtained by the PCB of each of the plurality of devices 605-615 is selectively gathered, obtained, monitored, stored, recorded, and/or analyzed by the management system 620.

According to some embodiments, data that is selectively gathered, obtained, monitored, stored, recorded, and/or analyzed, preferably comprises, for example, working time, current, voltage, power, and so forth from, for example, a battery, an engine, a transmission, a transaxle, a dispensing nozzle/plate/blade, a tire, a timer, a fuel tank, a chemical/fertilizer supply tank, and other components of the fertilizer/chemical dispenser. This data or information is preferably received at the PCB 500 (FIG. 2) associated with the fertilizer/chemical dispenser 10. That is, the PCB 500 controls the operations of each of the components of the device. As described above, the operational data for each of these components can be captured and logged by the PCB 500 and stored in memory on the PCB 500. In other embodiments, operational data can be stored in memory on the PCB 500 and transmitted asynchronously in batches (according to memory size) to the management server 620. In some embodiments, the operational data can be streamed from the PCB 500 to the management server 620 synchronously.

Each device can be managed by assignment of a device ID by the management system. The device ID can be an assigned number, a SIM card number, an IMEI, a MAC address, an IP address, or other similar unique identifier. The device ID can be appended to each communication transmitted by the PCB 500 to the management server 620.

Stored data or information is preferably analyzed by the management server 620 for parameter compliance, and if, necessary such data or information is then communicated to, for example, an end user, servicing personal, and/or owner. For example, the owner of a fertilizer/chemical dispenser can set a threshold of hours of operation for the device that are required per jobsite, day, and/or week. If the fertilizer/chemical dispenser is not operated for a period of time that meets or exceeds this threshold, the fertilizer/chemical dispenser is identified by the management system 620.

The transfer of data with regard to each individual machine will, among other things, help end users better plan for number of machines and employees at each individual work site. Companies with sizeable staff will find it relevant and useful. It will also improve turn drive (e.g., not having the inner wheel of the fertilizer/chemical dispenser tear the lawn while turning or maneuvering around a tree) and customer service.

In one embodiment the data or information with regard to usage of each individual machine or spreader is collected and transmitted daily at a specific time to, for example, the management server. This will allow end users, as well as, owners, managers, and dealers to access the information that they need, so as to monitor usage of these machines and allow them to extract maximum efficiency during operations. In another embodiment of the present invention, other than information for individual days, cumulative totals and averages are readily available too, and the information is preferably updated through the lifespan of the fertilizer/chemical dispenser. Examples of data or information uploaded on a daily basis include, for example, the operator's performance, the number of hours and specific time the machine was in operation during the previous 24 hours, the monthly total hours for machine usage, and the total hours of machine usage. Furthermore, the present invention enables recording and analysis of an accumulation total for working parts like batteries, dispensing nozzles/plates/blades, oil, fertilizer supply, chemical supply, etcetera. Since each component has a lifespan, it will help distributors, dealers, owners, and users selectively monitor the exact time when these components (e.g., need to be changed instead of waiting for them to break down, which will affect the working efficiency of the end users. Another important advantage of having this data or information transfer is that in the event the machine breaks down, (e.g., engine, transmission, dispensing nozzle/plate/blade, etcetera stops working), what has broken down will be selectively transmitted to the appropriate servicing personnel by email and/or cell phone text messaging that is/are responsible for the repairs and maintenance of the machines, management of the end user, and so forth.

Figure 4:
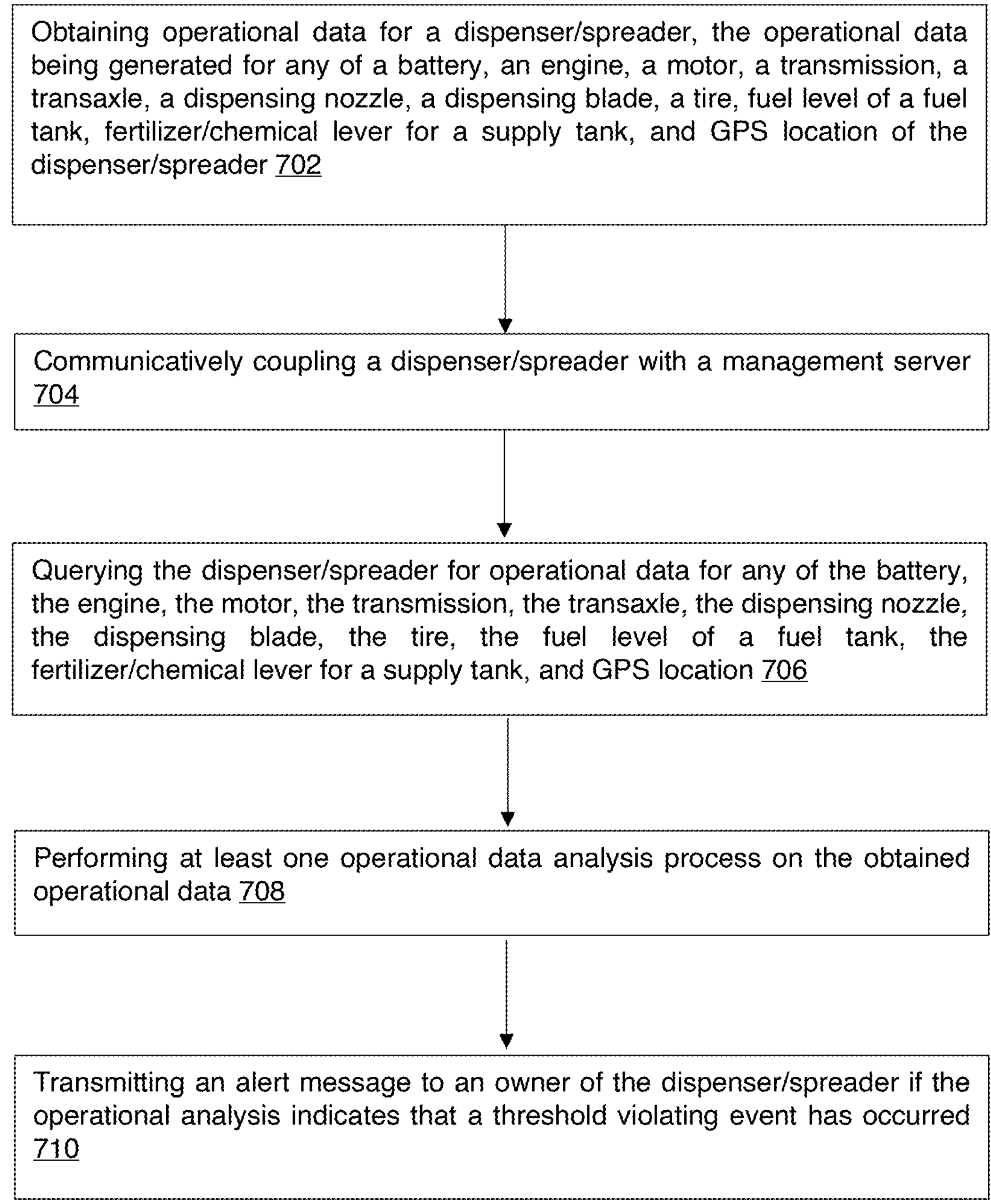
FIG. 4 of the drawings is a flow chart of a method in accordance with the present invention.

FIG. 4 is a flowchart of an example method of the present technology. The method includes obtaining 702 operational data for a fertilizer/chemical dispenser, the operational data being generated for any one of, for example, a battery, an engine, a transmission, a transaxle, a blade, a tire, a timer, and a fuel tank of the fertilizer/chemical dispenser.

As mentioned above, this operational data can be gathered by a PCB (such as PCB 500 of FIG. 2) during operation of the fertilizer/chemical dispenser.

The method also comprises communicatively coupling 704 a fertilizer/chemical dispenser with a management server. As mentioned above, this could comprise a wireless communication module of the PCB 500 coupling with the management server over a network connection.

Once the fertilizer/chemical dispenser and the management server are communicatively coupled with one another, the method can further comprise the management server querying 706 the fertilizer/chemical dispenser for operational data for any one of, for example, a battery, an engine, a transmission, a transaxle, a dispensing nozzle/plate/blade, a tire, a timer, and a fuel tank of the fertilizer/chemical dispenser. For example, the management server can request battery related operational data from the fertilizer/chemical dispenser. As mentioned above, this operational data can be stored on the fertilizer/chemical dispenser in the memory of the PCB. In another example, the management server can request operational data for the blades and tires.

In another embodiment, the PCB can upload all operational data gathered since a last communication session with the management server. This operational data can include operational data as disclosed hereinabove.

In some embodiments, the management server is performing 708 at least one operational data analysis process on the obtained operational data.

Examples of operational data analysis include in one example, comparing the operational time frames for the fertilizer/chemical dispenser to an expected operational time frame. For example, the owner will determine an operational time frame that the fertilizer/chemical dispenser should be utilized for. This operational time frame can be calculated from an expected time based on land or lawn square footage, or any other quantifiable metric that can be used to set an operational time frame threshold. Once this threshold is established, the management server can compare the actual operational time frame utilized over a given period of time to the operational time frame threshold. If the actual time does not meet or exceed the operational time frame threshold, the management server can alert the owner.

Thus, in some embodiments, the method includes transmitting 710 an alert message to an owner of the fertilizer/chemical dispenser if the operational analysis indicates that a threshold violating event has occurred. To be sure, a threshold violating event is any event in which operational data for one or more components of the fertilizer/chemical dispenser do not appropriately compare with an operational threshold.

In another example, an operational threshold could include a minimum run time for the fertilizer/chemical dispenser. If the fertilizer/chemical dispenser is not run for an appropriate amount of time because the user rushed the job, then the job quality can be compromised and/or the lawn can be damaged by the wheels.

In another example, an operational threshold can be set for the dispensing nozzles/plates/blades, which can include a comparison with another operational metric such as total operational time. Assume that the total operational time (e.g., power on to power off) for the fertilizer/chemical dispenser is one hour, but the dispensing nozzles/plates/blades is only operational for two minutes of the one hour, it can be deduced that the fertilizer/chemical dispenser was not in actual use for the entire hour.

Additional metrics can be gathered by tracking revolutions of the transaxle, which can be extrapolated into square foot coverage of the fertilizer/chemical dispenser. Ideally, transaxle revolutions should be compared to overall operational time to ensure that the fertilizer/chemical dispenser is moving during power on and/or PTO engaged periods. If the fertilizer/chemical dispenser is left on when no work is being accomplished, this can lead to unnecessary fuel consumption.

Knowledge of the approximate square footage of a treatment area can also be used to determine if the fertilizer/chemical dispenser is being utilized properly. For example, if by counting transaxle revolutions that the fertilizer/chemical dispenser has only treated approximately 400 square feet, when the total expected square footage for the treatment area is 2,000 square feet, the management server can detect this discrepancy and transmit an alert message to the owner or anther interested party.

Figure 5:
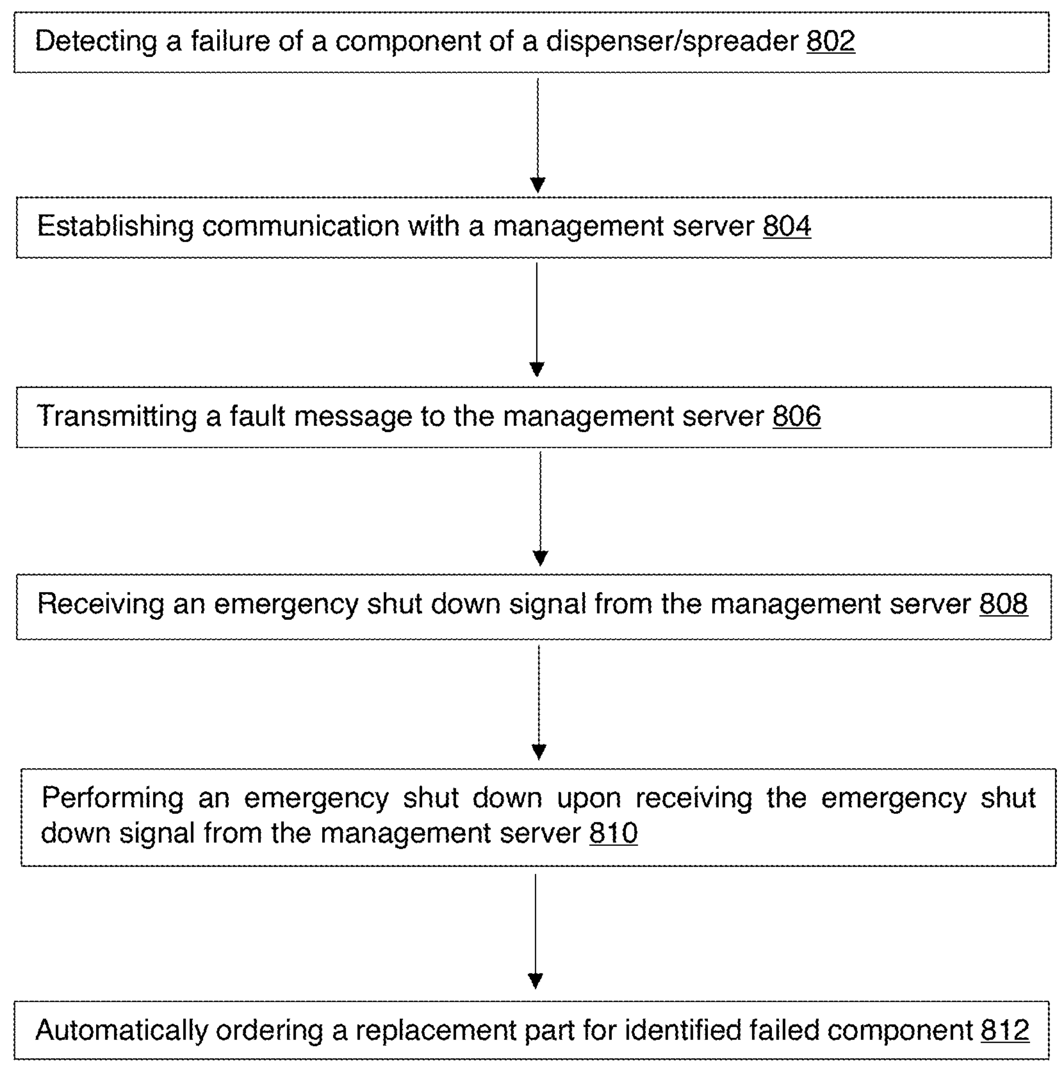
FIG. 5 of the drawings is a flow chart of another method in accordance with the present invention.

FIG. 5 is another flowchart of an example method of the present technology. The method includes a step of detecting 802 a failure of a component of a fertilizer/chemical dispenser during operation of the detecting 802 a failure of a component of a fertilizer/chemical dispenser during operation or startup of the fertilizer/chemical dispenser. For example, the PCB can maintain a set of operational thresholds for each component of the fertilizer/chemical dispenser. Whenever any of these components is operating below this expected operational threshold, a failure can be deemed to have occurred.

Upon detection of a failure, the method includes the PCB establishing 804 communication with a management server, as well as a step of transmitting 806 a fault message to the management server. The fault message can include an indication as to the component that failed.

If the failure involves a component of the fertilizer/chemical dispenser that could cause the fertilizer/chemical dispenser to be a safety hazard, the method can include the fertilizer/chemical dispenser receiving 808 an emergency shut down signal from the management server. The method also includes performing 810 an emergency shut down upon receiving the emergency shut down signal from the management server. Examples of emergency shut down procedures are described in greater detail supra.

In one embodiment, the method includes an optional step of automatically ordering 812 a replacement part for identified failed component. The fertilizer/chemical dispenser can communicate directly with a third-party system over the network to order the replacement part. In another embodiment, the management server can identify the failed component and perform a lookup of the manufacturer of the failed component and forward the request to the third-party system or a local inventory system. The management server can order the part automatically as the fault message is received. In another example, a replacement component in inventory can be identified and identified in a repair ticket that is transmitted to a repair technician.

In some embodiments, the present invention enables upgrades to the software that end users are using that may address, for example, compatibility issues, or other necessary upgrades. In one embodiment, the management server can push updates to the fertilizer/chemical dispenser during operational data transfer operations, or upon powering up the fertilizer/chemical dispenser. For example, each time the fertilizer/chemical dispenser is powered on, the PCB can link with the management server and query the management server for updates. This can all occur transparently to the end user, unless a short pause in operation of the fertilizer/chemical dispenser is required to implement the update or for safety reasons.

FIG. 6 is a diagrammatic representation of an example machine in the form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 905 (e.g., a central processing unit (CPU), a graphics processing unit (GPU), or both), and a main memory 910 and static memory 915, which communicate with each other via a bus 920. The computer system 900 may further include a video display 935 (e.g., a liquid crystal display (LCD)). The computer system 900 may also include an alpha-numeric input device(s) 930 (e.g., a keyboard), a cursor control device (e.g., a mouse), a voice recognition or biometric verification unit (not shown), a drive unit 937 (also referred to as disk drive unit), a signal generation device 940 (e.g., a speaker), and a network interface device 945. The computer system 900 may further include a data encryption module (not shown) to encrypt data.

The disk drive unit 937 includes a computer or machine-readable medium 950 on which is stored one or more sets of instructions and data structures (e.g., instructions 955) embodying or utilizing any one or more of the methodologies or functions described herein. The instructions 955 may also reside, completely or at least partially, within the main memory 910 and/or within the processors 905 during execution thereof by the computer system 900. The main memory 910 and the processors 905 may also constitute machine-readable media.

The instructions 955 may further be transmitted or received over a network via the network interface device 945 utilizing any one of a number of well-known transfer protocols (e.g., Hyper Text Transfer Protocol (HTTP)). While the machine-readable medium 950 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Additional structural and/or functional features of PCB/controller 500 and associated networked system of devices that are communicatively coupled with a management server over a network are provided in U.S. patent application Ser. No. 17/471,465 entitled "FERTILIZER/CHEMICAL DISPENSERS HAVING INTELLIGENT SYSTEMS (SMART SPREADER LOGIC), ASSOCIATED SUB-ASSEMBLIES INCORPORATING INTELLIGENT SYSTEMS, AND ASSOCIATED METHODS OF USE." It will be understood that the fertilizer/chemical spreaders-sprayers-dispensers of the present invention can utilize the technology disclosed in the '465 application, and that one or more fertilizer/chemical spreaders-sprayers-dispensers may substitute the fertilizer/chemical dispensers in a network of devices.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A fertilizer/chemical dispenser, comprising:

a frame sub-assembly;

a first reservoir for containing chemical solids, wherein the first reservoir is associated with the frame sub-assembly;

a first dispenser for dispensing chemical solids;

a second reservoir for containing chemical liquids, wherein the second reservoir is associated with the frame sub-assembly;

a second dispenser for dispensing chemical liquids;

at least one ground-engaging drive wheel;

an engine, wherein the engine is associated with the frame sub-assembly; and an image sensor operably connected to a controller, wherein the controller collects operational data comprising at least nozzle engagement time and total operational time of the fertilizer/chemical dispenser, wherein the controller communicatively couples the fertilizer/chemical dispenser with a remote management server over a network, and wherein the management server analyzes the operational data against a predetermined operational threshold and transmits a threshold-violation alert to an owner of the fertilizer/chemical dispenser upon determining that the operational data fails to satisfy the predetermined operational threshold.

2. A fertilizer/chemical dispenser, comprising:

a frame sub-assembly;

a first reservoir for containing chemical solids, wherein the first reservoir is associated with the frame sub-assembly;

a first dispenser for dispensing chemical solids;

a second reservoir for containing chemical liquids, wherein the second reservoir is associated with the frame sub-assembly;

a second dispenser for dispensing chemical liquids;

at least one ground-engaging drive wheel;

an engine, wherein the engine is associated with the frame sub-assembly; and a chemical dispenser control logic system comprising an image sensor operably connected to a controller, wherein the image sensor and controller are configured to selectively gather, obtain, monitor, store, and record data associated with a lawn treatment area prior to application of fertilizer/chemical, and wherein the controller communicatively couples the fertilizer/chemical dispenser with a management server over a network and transmits operational data to the management server for analysis, and wherein the management server monitors nozzle engagement time relative to total operational time and transmits a threshold-violation alert to an owner of the fertilizer/chemical dispenser upon determining that the nozzle engagement time fails to satisfy a predetermined operational threshold.

3. A fertilizer/chemical dispenser system, consisting of:

a self-propelled fertilizer/chemical dispenser having a frame sub-assembly, a first reservoir for chemical solids, a first dispenser for dispensing chemical solids, a second reservoir for chemical liquids, a second dispenser for dispensing chemical liquids, at least one ground-engaging drive wheel, an engine, and a controller;

a remote management server communicatively coupled to the controller of the fertilizer/chemical dispenser over a network; and wherein the controller transmits operational data comprising nozzle engagement time and total operational time to the management server, and wherein the management server transmits a threshold-violation alert to an owner of the fertilizer/chemical dispenser upon determining that the nozzle engagement time relative to the total operational time fails to satisfy a predetermined operational threshold.

* * * * *